United States Patent [19]

Burkett et al.

[11] Patent Number: 5,317,130

[45] Date of Patent: May 31, 1994

[54] PROGRAMMABLE LOAD COMPENSATION METHOD AND APPARATUS FOR USE IN A FOOD OVEN

[75] Inventors: Doug Burkett; Gary Mercer, both of Eaton, Ohio

[73] Assignee: Henny Penny Corporation, Eaton, Ohio

[21] Appl. No.: 746,910

[22] Filed: Aug. 19, 1991

[51] Int. Cl.$^5$ .............................................. H05B 1/02
[52] U.S. Cl. ................................... 219/497; 219/486; 219/483; 219/492; 219/413; 99/328
[58] Field of Search ............................ 219/410-413, 219/483-486, 492, 494, 501, 506, 508; 99/325, 329, 328

[56] References Cited

U.S. PATENT DOCUMENTS

| | | | |
|---|---|---|---|
| 4,188,520 | 2/1980 | Dills | 219/486 |
| 4,238,669 | 12/1980 | Huntley et al. | 219/403 |
| 4,316,078 | 2/1982 | Mack et al. | 219/386 |
| 4,379,964 | 4/1983 | Kanazawa et al. | 219/492 |
| 4,862,225 | 8/1989 | Heiller et al. | 219/486 |
| 4,924,073 | 5/1990 | Chiba | 219/413 |
| 4,962,299 | 10/1990 | Duborper et al. | 219/492 |

Primary Examiner—Mark H. Paschall
Attorney, Agent, or Firm—Baker & Botts

[57] ABSTRACT

A method and apparatus is disclosed which automatically adjusts the on-time of preferably quartz lamp heating elements in an oven having both quartz lamp and electric heating elements. In such an oven having dual heating elements, the temperature of the oven's cavity increases when numerous food items (loads) are rapidly cooked in succession. The present invention allows a dual heating element oven to automatically compensate for these increases in temperature by preferably shortening a predetermined on-time of the quartz bulbs. The on-time is continuously compensated using a microcomputer, dependent upon the current oven temperature. The microcomputer preferably uses at least two clocks to shorten the predetermined on-time of the quartz bulbs.

27 Claims, 5 Drawing Sheets

Microfiche Appendix Included
(4 Microfiche, 223 Pages)

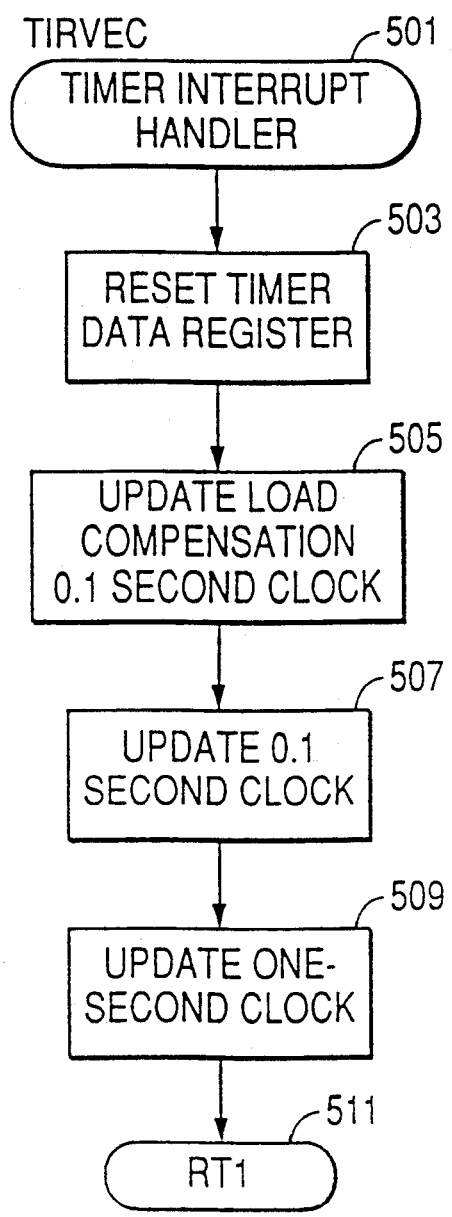

PROGRAMMABLE LOAD COMPENSATION METHOD AND APPARATUS FOR USE IN A FOOD OVEN

REFERENCE TO MICROFICHE APPENDIX

Source code for the process performed by the present invention in a preferred embodiment is contained with this application in 224 frames on 4 microfiche, in the microfiche appendix.

CROSS-REFERENCES TO RELATED APPLICATIONS

This application is related by subject matter to "PREHEATING METHOD AND APPARATUS FOR USE IN A FOOD OVEN", Ser. No. 7/746,760, pending, and to "METHOD AND APPARATUS FOR OPERATING A FOOD OVEN", Ser. No. 7/748,200 now U.S. Pat. No. 5,182,439, both by the same inventors and filed concurrently herewith.

BACKGROUND OF THE INVENTION

1. Field of the Invention

This invention relates generally to the field of food ovens. More specifically, the present invention is directed to a food oven having two heating elements whereby control means are provided for automatically adjusting the heating elements to efficiently cook a particular food item.

2. Description of the Relevant Art and Problem

Today, restaurants find it increasingly more desirable to efficiently cook food in order to provide fast service and to reduce the labor costs involved in the cooking process. Efficiency means that a particular food item is cooked in a short time and with minimal interaction required from an operator while not sacrificing food quality.

Many ovens currently in use contain a single heating element and the user must set the temperature and monitor the food item to determine when to remove it from the oven. Some ovens contain a timer which turns the heating element on and off to allow a food item to cook for a predetermined time.

U.S. Pat. No. 4,238,669 to Huntley, is directed to and entitled, an Oven Having Dual Heating Means. This invention describes an oven having a base plate which is heated. Food items may be placed directly on the heated base plate. A second heating element, preferably a quartz lamp heating element, is placed above the base plate, in the oven's cavity. This quartz heater has a greater thermal intensity than the base heater. A timer is provided which allows the quartz heater to be turned on after a predetermined time, and remain on for a second predetermined time. This would allow, for example, the top of a pizza to be browned quickly after the pizza had almost fully cooked. Thus, the brief time but intense heat from the quartz heater permits a pizza to be rapidly cooked and the top browned without sacrificing food quality.

However, an operator must select a proper time for when the quartz heater should be operated, and also determine how long the quartz heater should be operated. These two time periods differ depending upon the current temperature of the oven and the type of food being cooked. Only an operator skilled with this type of oven having dual heating elements can accurately determine the most efficient time and method for cooking a particular food item. Consequently, there is a need to provide an automatic means for operating such a dual heating element oven which considers both the current temperature of the oven and the type of food being cooked.

Restating the problem, unless the food item is constantly monitored by the operator, it may become overcooked because of previous cooking cycles heating the oven which increases the latent heat stored in the air and oven structure. For example, an oven which uses quartz lamp bulbs as well as conducted and convected heat will overcook pizzas if pizzas are rapidly cooked in sequence.

SUMMARY OF THE INVENTION

The problems of the prior art are solved by the present invention. The present invention is capable of automatically preheating an oven having dual heating means. Additionally, the present invention provides a means of programming the oven to vary the on time of the quartz heating element depending upon the type of food item to be cooked. Furthermore, the present invention allows the oven to automatically adjust these quartz lamp on times depending upon the current temperature of the oven.

More specifically, the present invention preferably allows up to three cooking intervals to be programmed: brown, cooked and finish intervals. One cooking cycle may consist of each of these three intervals, each interval being set for a period of 0 to 15 minutes. However, while staying within the scope of the present invention, each interval could just as easily be longer than 15 minutes in length. The quartz lamps within the oven may be programmed to be switched either on or off during each interval. For example, the quartz lamp could be on briefly during the brown interval, off during the lengthier cook interval and on again briefly during the finish interval.

To ensure uniform consistency of a cooked food item, the present invention provides a method for programmable load compensation. This method consists of automatically compensating for variations in the temperature of the food product placed in the oven, as well as the amount of stored heat accumulated within the oven from previous use. That is, the effect of the food product temperature on the air temperature is measured by directly measuring the air temperature. Compensation is performed by varying the amount of time during which the quartz lamps are turned on during a specific interval as a function of preferably three factors: the actual air temperature within the oven cavity, the base temperature set point, and a programmable load compensation factor. First, regarding air temperature, when the air temperature increases, the actual on-time of the quartz lamp decreases. Thus, above a certain air temperature, no additional compensation takes place. Conversely, below a certain air temperature no load compensation takes place.

Second, the base temperature set point is a temperature value preferably predetermined and stored into non-volatile memory of the present invention. Like setting a thermostat, this value tells the oven at which temperature it should maintain itself. The set point may be set depending upon the particular food item to be cooked.

Third, the load compensation factors are programmed into non-volatile memory of the present invention. These factors correspond to the length of cooking time required for different food items. Increasing the load compensation factor decreases the actual on-time of the quartz lamp. For example, a small sandwich requires less cooking time and thus would have a larger load compensation factor than a larger food item such as a pizza which would require a smaller load compensation. All three of the above factors vary quartz lamp on-time.

Additionally, the present invention allows for a method of automatically preheating the oven based upon its immediate usage history. This preheat function operates by regulating the base heating elements until they are within a specified temperature range from the program base set point temperature, and then turns the quartz lamps on until the air temperature within the oven cavity reaches a certain fixed preheat "exit" temperature. This preheat exit temperature need not be a fixed value, but can be a function of the base set point temperature or the air temperature before or during the preheat operation. In addition, the preheat function can be performed at various times during the oven's operation, and not necessarily upon power up of the oven.

The above descriptions of the present invention provide only a broad overview of preferred embodiments within the present invention. The details of certain aspects of the present invention will be more fully understood from the following specification and drawings.

BRIEF DESCRIPTION OF THE DRAWINGS

FIG. 4 shows a flowchart of the timer interrupt handler steps performed by the present invention.

DETAILED DESCRIPTION

The present invention preferably embodies a hardware controller which performs various functions on the oven. The hardware for the controller will first be described, with the functions and steps performed by the hardware described thereafter.

Hardware Description

Figure 1:
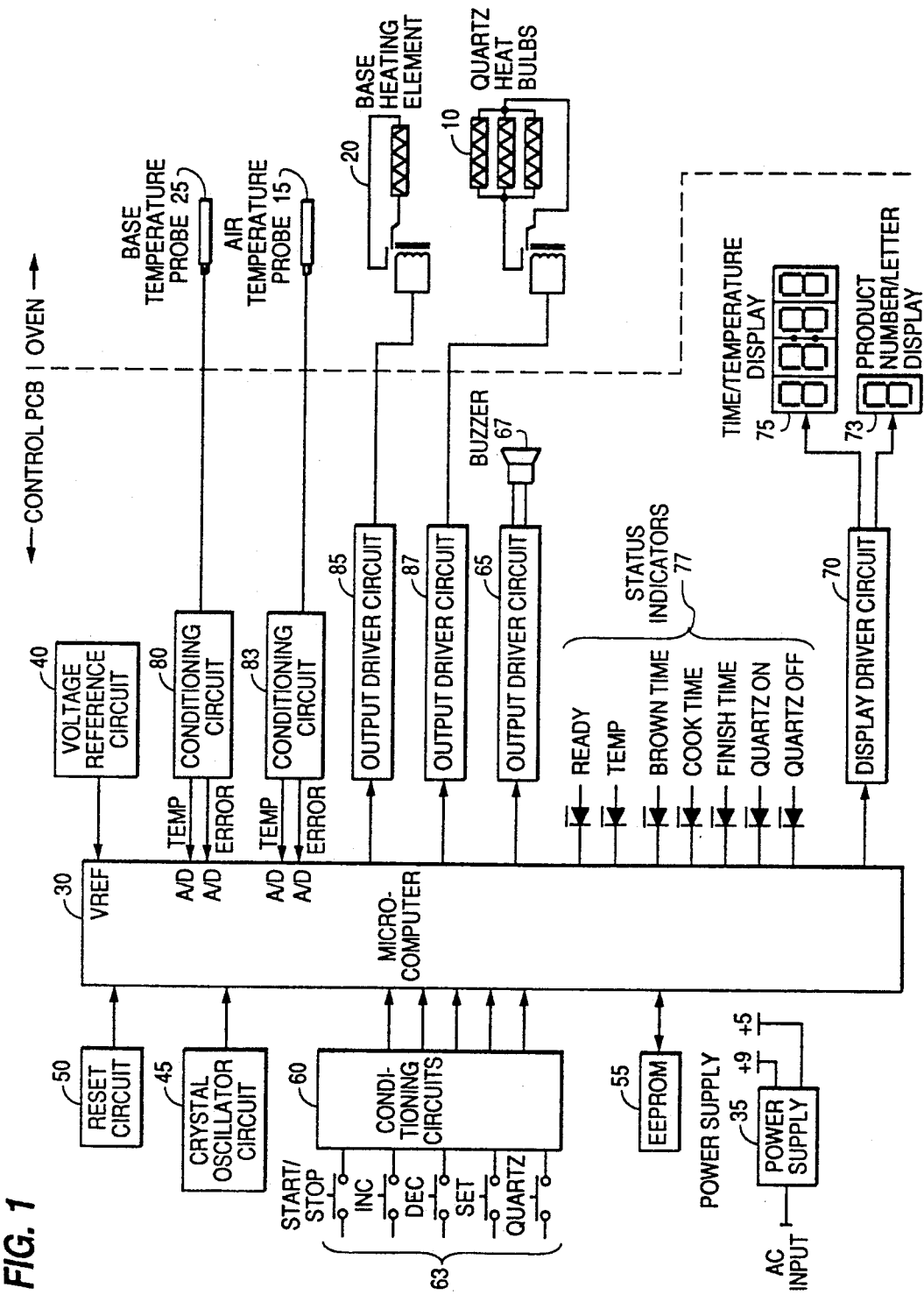
FIG. 1 shows a block diagram of the control hardware for the oven in the present invention.

Referring to FIG. 1, two heating elements 10 and 20 are disposed within an oven having a base and a cavity (not shown). Base heating element 20 is located preferably underneath a base plate, preferably the HTX TRANSITE II TM base by BNZ MATERIALS, INC. However, other base materials such as metal, compressed asbestos, ceramics or other materials on which food may directly be placed and which are able to withstand great temperatures may be used. Base heating element 20 could be a gas heater or other heating means, but preferably is a 3200 watt CALROD electric heating element.

Located within the oven's cavity and above the base plate, preferably near the roof of the cavity, is located the second heating means 10, preferably quartz heat bulbs. The quartz heat bulbs must be able to provide a higher thermal intensity for a substantially brief heating period as opposed to the base heating element 20. Base heating element 20 preferably provides conducting heat whereas the quartz heat bulbs 10 preferably provide radiant heat. Both heating means also have appropriate relays or other circuitry to properly switch or toggle them from a first state (on) or a second state (off).

Two temperature probes are provided within the oven to detect temperature within the cavity and base of the oven. Base temperature probe 25 is thus located within or proximate to the base while air temperature probe 15 is located within an air duct immediately outside the oven cavity. Base temperature probe 25 should be placed so as to receive approximately the mean temperature of the base. Similarly, air temperature probe 15 should be placed within the oven cavity, so that it may detect the mean temperature of the air within the oven cavity. Consequently, probes 15 and 25 should not be placed too far, nor too close to heating elements 10 and 20.

Microcomputer 30, which preferably is a Motorola MC68705R3L, provides the computing resources for the hardware, and specifically for the control board. This microcomputer includes a microprocessor and also includes a Conditioning circuit 60 provides preferably pull-down resistors which insure that switch input voltages from user input switches 63 do not float when no switch is pressed. Thus, circuit 60 results in preferably an output voltage of approximately 5 volts when a switch is pressed, and approximately 0 volts when no switch is pressed.

LED status indicator 77 is provided to indicate the following states: ready, temperature, brown time, cook time, finish time, quartz lamp on, quartz lamp off. These states will be describe in more detail below. Signals from microcomputer 30 are coupled to status indicators 77, preferably, LEDs, but could be other indication means.

Display driver circuit 70 is preferably an integrated circuit such as MC14489. The display driver circuit 70 preferably is a multiplexing driver circuit to drive time/temperature display 75 and product number/letter display 73. Displays 73 and 75 are preferably seven segment LED displays, but could be other indicating means as are well known in the art. Displays 73 and 75 and indicator 77 are preferably physically located on the control panel on the front panel of the oven. Seven segment display 75 can display both time, numbers and limited alphanumeric messages of up to four characters. Display 73 is used to display the current selected product number from 1 to 9 or a letter from A through F.

Buzzer 67 is preferably a piezoelectric buzzer having a main feedback and ground connection. The buzzer is used to provide audible feedback to the operator of various control operation conditions. Output driver circuit 65 preferably is a modified Hartly oscillator which drives buzzer 67 circuit near its resonant frequency for maximum efficiency in terms of sound pressure level. Output driver circuit 65 preferably includes a switch or means to select a desired setting for the buzzer sound pressure level. Associated driver circuitry is also included in driver circuit 65 as is well known in the art.

Temperature sensor conditioning circuits 80 and 83 are preferably identical signal conditioning circuits connected to base temperature probe 25 and air temperature probe 15, respectively. Conditioning circuits 80 and 83 also preferably include circuitry to determine probe failure in either "open" or "shorted" failure modes and forward signals to microcomputer 30. Thus, two inputs, a temperature and error inputs, are provided from each conditioning circuit 80 and 83 into the A/D inputs of microcomputer 30. Associated capacitors are provided in conditioning circuits 80 and 83 to provide for EMI and other noise filtering functions, as are well known in the art.

Output driver circuits 85 and 87 are preferably two identical output circuits for driving base heating element 20 and quartz heat bulbs 10, respectively. Driver circuits 85 and 87 preferably include optoisolated triac driver integrated circuits such as MOC3041. Appropriate protection circuitry is provided to prevent false turn-on as is well known in the art. Control signals are provided from microcomputer 30 into driver circuits 85 and 87 to turn on heating elements 20 and 10 at appropriate times, as will be discussed more fully below.

The present invention preferably also includes circuitry to provide for additional heating means in the oven should they be desired to provide even greater flexibility and control as the presently described embodiment. A fan fail circuit may also be provided to detect failure of the off-board cooling fan and thus warn an operator or shut down the system to prevent further damage.

Overall Process Performed

The overall operation of the process of the present invention in a preferred embodiment is depicted in the flow diagram of FIG. 3, and will now be described in some detail below. The process is executed by microcomputer 30 (shown in FIG. 1) and resides in the internal non-volatile memory of microcomputer 30 (not specifically shown in FIG. 1).

Figure 3:
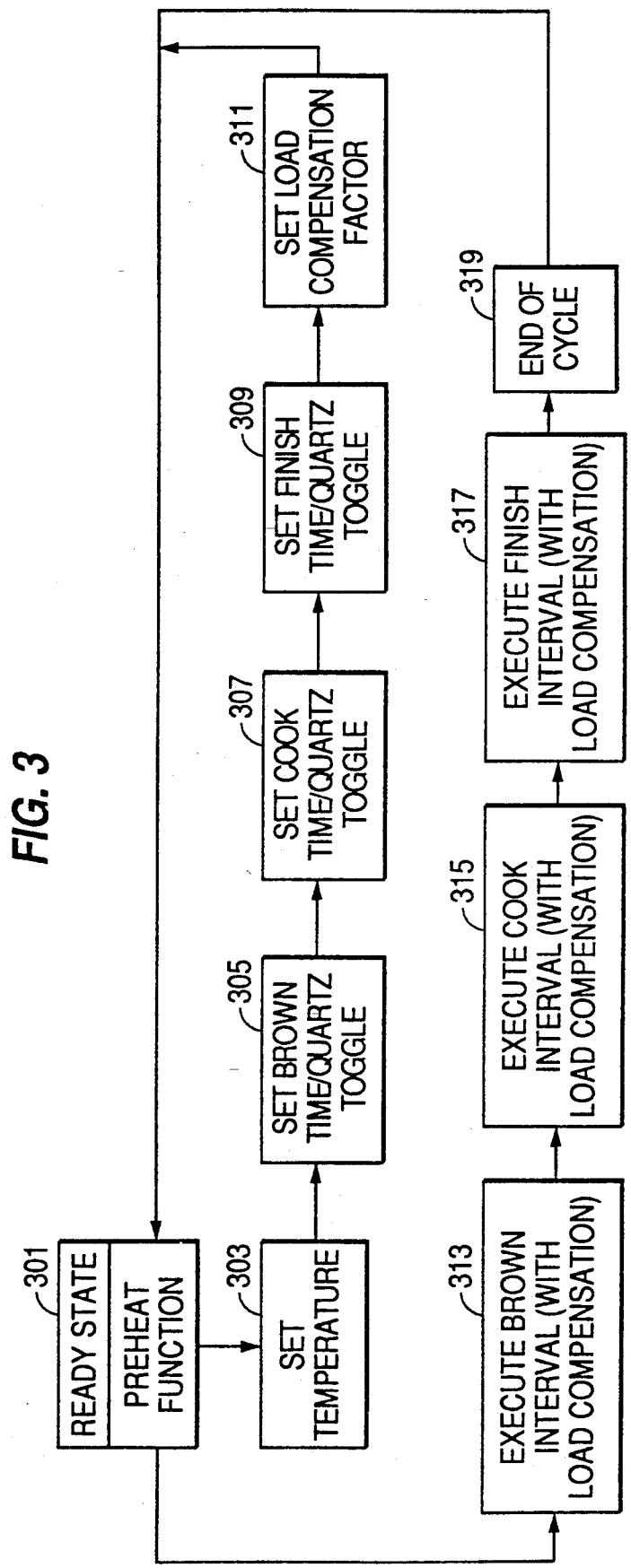
FIG. 3 shows a flowchart for the overall functioning of the present invention.

Referring to FIG. 3, the three aspects of the present invention are shown interacting with one another. Specifically, step 301, the ready state/preheat function is performed when the oven's operation is initially started, and is repeated as needed thereafter. This step generally consists, in part, of heating the base of the oven to a predetermined temperature by means of activating the base heating element (element 20 in FIG. 1) and thereafter heating the air in the oven's internal cavity to a predetermined temperature by means of the quartz heat bulbs (element 10 in FIG. 1). The automatic preheat steps are described in more detail in copending application entitled "PREHEATING METHOD AND APPARATUS FOR USE IN A FOOD OVEN" by the same inventors and incorporated herein by reference.

When a user of the present invention wishes to set the various parameters corresponding to the operation of the oven, he/she may press a "SET" switch (such as the "SET" switch of element 63 of FIG. 1). In a preferred embodiment, the present invention will thereafter prompt the user to enter the various parameters, examples of which are illustrated in steps 303-311. For example, in a preferred embodiment, the user may utilize the increment/decrement switches of element 63 (INC and DEC) to modify the parameters in steps 303-311. In another embodiment, the user may directly enter the desired parameters on a device such as a numeric keypad, etc.

Step 303 comprises setting the base setpoint temperature for the oven. This value represents the desired temperature of the base plate of the oven. This value is used during the preheat function (step 301), as well as the actual oven usage intervals as described below with respect to steps 313-317.

Steps 305-309 comprise setting the time for the "brown", "cook" and "finish" intervals as well as switching the quartz lamps to either be on or off during each interval according to one embodiment of the present invention. The selected values are stored in memory. In a preferred embodiment, the operator may select a time duration between 0-15 minutes for each cooking interval, where the total cooking time is the sum of the selected cooking interval times. The time of each interval may be displayed on display 75. After the time for a particular interval is selected, the operator sets heating element 10 to be on or off during that interval. A toggle switch may be provided to set heating element 10. The operator then selects the time for the next interval. However, the order in which the values are selected is not critical. For example, each of the interval times may be selected first, and then the heating element 10 may be set for the individual intervals. In addition, the structure used to select the interval times and to selectably set heating element 10 is not critical. One of skill in the art may recognize a variety of structures to accomplish these functions, including a numeric keyboard with an on/off button, individual buttons, dials, etc. In a preferred embodiment, LED status indicators prompt the operator to select a particular parameter.

The selected times and settings are stored within the control system of the present invention, and are thereafter utilized in steps 313-317 to determine the appropriate timing characteristics of the various cooking intervals and the operation of heating element 10. In a preferred embodiment, the first heating element 10 is set on during the "brown" interval, off during the "cook" interval, and on during the "finish" interval. These intervals and cooking steps are described in greater detail in copending application entitled "METHOD AND APPARATUS FOR OPERATING A FOOD OVEN" by the same inventors, incorporated herein by reference.

Steps 311 involves setting a load compensation factor. The load compensation factor is utilized by the load compensation aspect of the present invention to account for the type of load being cooked within the oven and the particular temperature within the oven. The load compensation factor is used by steps 313-315 in a preferred embodiment to compensate the timing characteristics of the various operating intervals, and it will be described in further detail below with respect to FIGS. 2a and 2b. After the load compensation factor has been set, execution transfers back to the ready state/preheat function until the user requests another operation.

Steps 313-317 involve executing the "brown", "cook" and "finish" intervals according to a preferred embodiment of the present invention. These steps are executed after the associated characteristics have been set in steps 303-311, and when the user selects, in a preferred embodiment, the "start" function by pressing the "Start/Stop" key ("START/STOP" switch of element 63 of FIG. 1). Steps 313-317 utilize the corresponding temperature, times, load compensation factor, and heating element 10 switch setting selected in steps 303-311. Specifically, the temperature set in step 303 is maintained throughout these steps, the times for the various intervals are kept in conjunction with the load compensation factor, and the quartz lamp operational status is maintained for each of the three intervals in a preferred embodiment. If the time of a particular interval is set to 0, that interval is skipped. Throughout the cooking cycle, status indicators 77 indicate the interval which is being executed.

Finally, step 319 corresponds to the end-of-cycle operation performed after the "brown", "cook" and "finish" intervals are completed. After this step has been reached, execution is transferred back to the ready state/preheat function of step 301. A more detailed description of a preferred embodiment of the present invention follows.

Load Compensation Operation

As described above, a purpose of the present invention is to ensure a uniformly processed product, regardless of product and environment variations. For example, the temperature of the food product entering the oven may vary depending on whether it is frozen or fresh, and how long it has been unrefrigerated before cooking. The stored heat of the oven will vary depending on the usage of the oven prior to cooking the product. For example, the stored heat of the oven will be greater after several pizza have been cooked, than it is during cooking the first pizza of the day. A system is needed which compensates for variations in the temperature of the product (load) and the environment—a load compensation.

Some experimental results indicate that one of the best ways to perform load compensation in an oven having two heating elements is to vary the on-time of the quartz lamp. The on-time of quartz lamp 10 preferably changes as the function of the actual air temperature in the oven and the base temperature set point measured by air temperature probe 15 and base temperature probe 25 respectively, as well as the load compensation factor. Thus, as the air temperature increases, the quartz on-time is shortened. In a preferred embodiment, the quartz on-time is never lengthened, although such an implementation is certainly possible.

Various degrees of load compensation may be programmed into EEPROM 55. Preferably, the load compensation may be set from 0 to 10. Zero is equivalent to no load compensation with 10 equivalent to (100%) load compensation. Load compensation may be programmed by the user from input switches 63 and stored in EEPROM 55. Additionally, the exterior front panel of the oven would preferably include a method of inserting a menu indicating which food item, and corresponding previously programmed load compensation, may be selected by a user.

Basically, implementation of the load compensation performs the following steps to determine the on-time of quartz lamp 10.

(1) Read the load compensation factor from a non-volatile memory.

(2) Set a variable "LcLim" to the difference between the base temperature set point (in A/D bits) and a constant.

(3) If "LcLim" is less than zero, then set LcLim to zero: otherwise, set LcLim to the base temperature set point multiplied by a constant minus another constant.

(4) During each pass through the main loop:
  (i) Set "TempErr" to the difference between the oven cavity air temperature and LcLim.
  (ii) Set a variable "N1" to TempErr multiplied by a load compensation value contained in a table indexed by the load compensation factor previously read from the non-volatile memory.
  (iii) Determine if variable N1 is less than a constant and if so assign it a value.
  (iv) Determine if TempErr is less than a constant. If so, assign LcReset a constant value. If not, assign LcReset the value of a constant minus N1 times a constant.

(v) When a cooking interval begins, if the quartz lamps have been programmed to be turned on during the interval, then:
  (i) Set "QClock" to the total number of seconds programmed for the cooking interval.
  (ii) Set "LcCount" to the value of LcReset, and set "LcSec" to a constant, preferably 10.
  (iii) During each timer interrupt, decrement LcCount, and when LcCount reaches zero, decrement LcSec.
  (iv) Decrement "QClock" when LcSet reaches zero.
  (v) Turn quartz lamps off when QClock reaches zero.

Figure 2A:
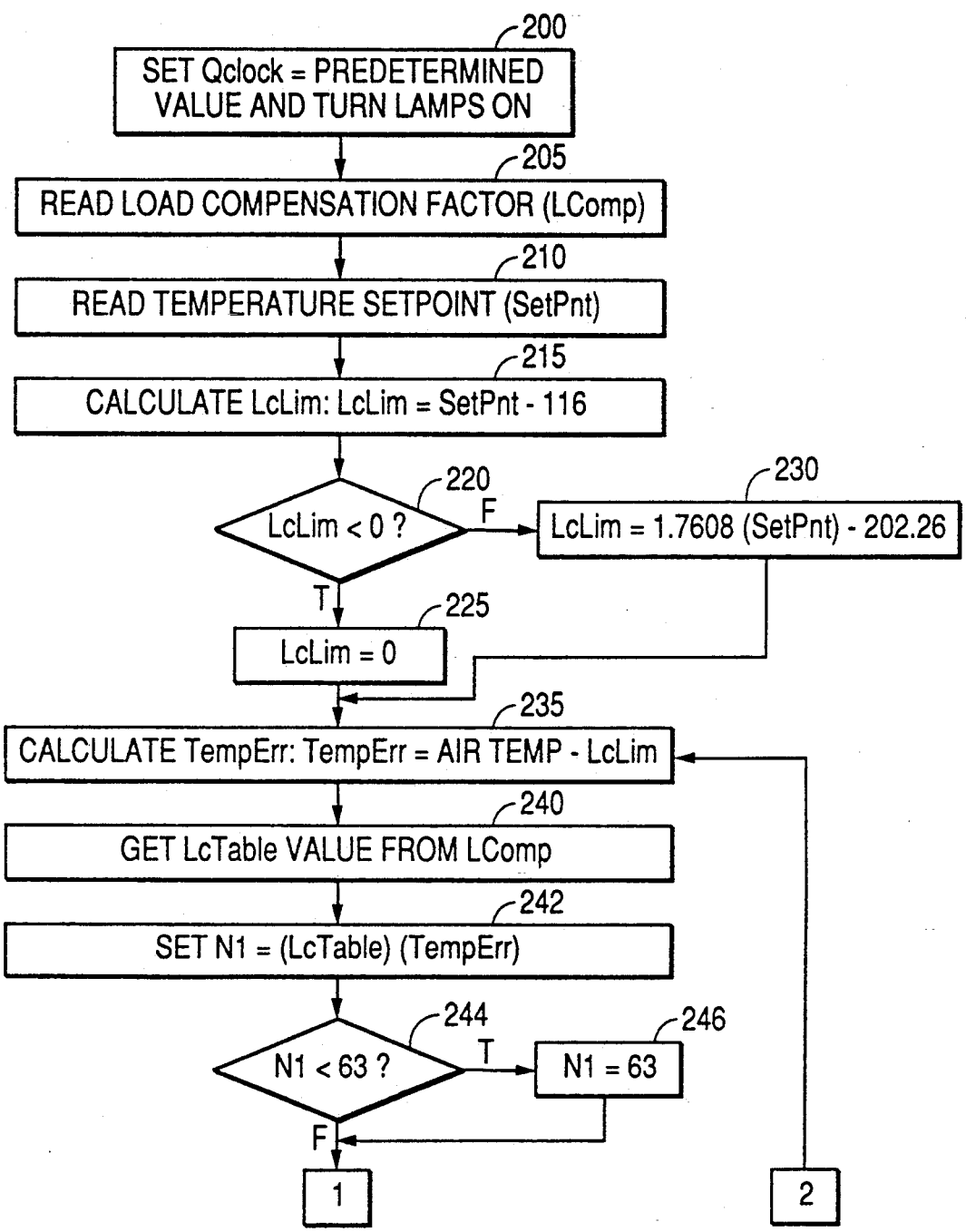
FIGS. 2a and 2b show flow charts detailing the operation of the present invention.
Figure 2B:
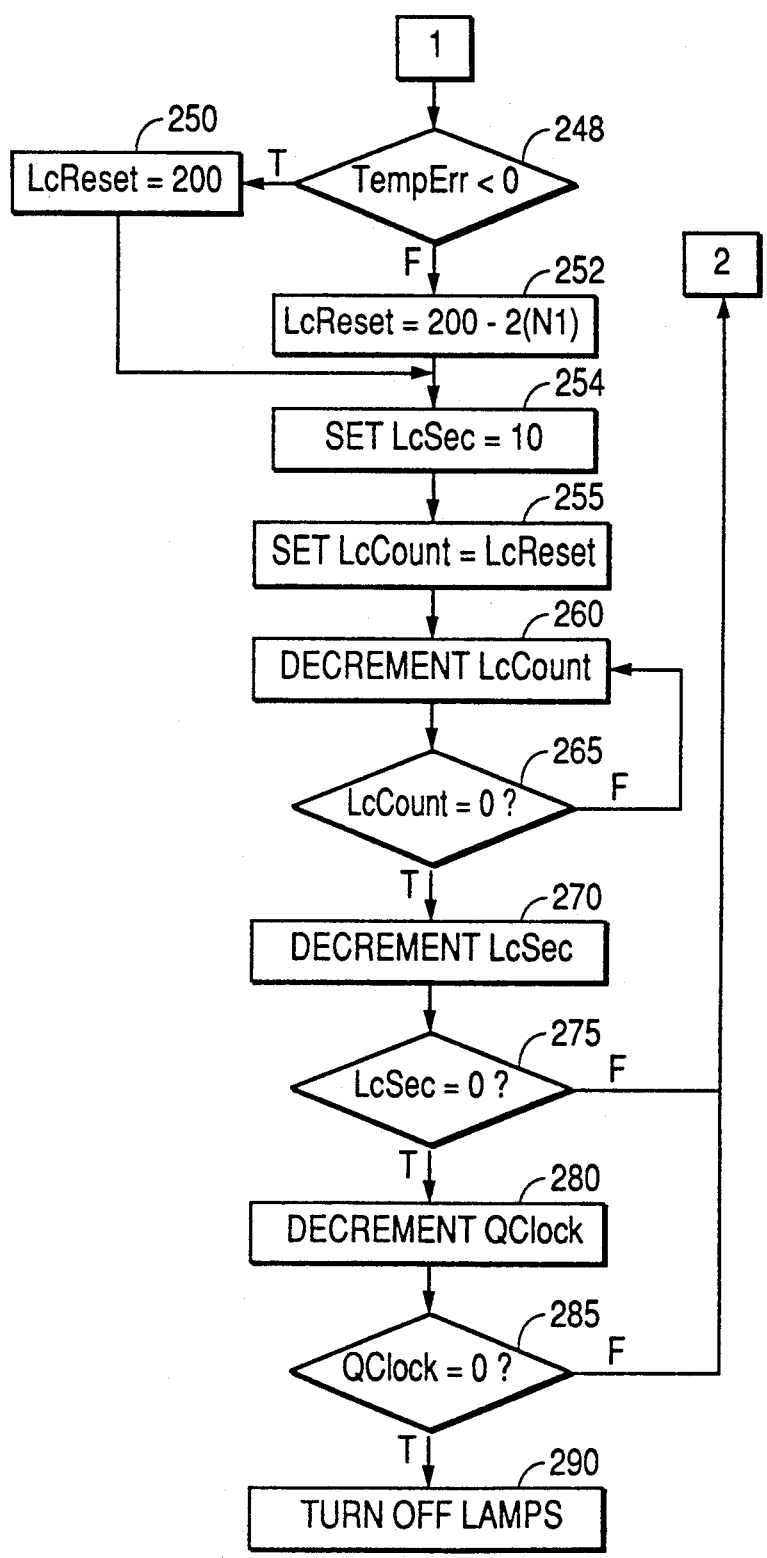

Referring to FIGS. 2a and 2b, the basic operation described above for the load compensation factor is depicted. Each time an interval starts during the cooking process (i.e. brown, cook or finish), the control program checks to see if the quartz lamps have been programmed on for that interval. If the quartz lamps had been programmed on, then a variable QClock is calculated as:

$$QClock = 60 \text{ (minutes)} + \text{seconds}$$

QClock obviously is then the total time in seconds. QClock is a clock that is run in parallel with the cooking time display 75 which is displayed on the front surface of the oven. QClock does not keeps "real" time but rather a compensated time depending upon the current air temperature of the oven and the load compensation factor. Thus, the higher the air temperature the more quickly QClock will decrement. Referring to FIG. 2a, QClock is set to a predetermined value for the particular cooking interval when the quartz lamps have been programmed on in block 200.

A load compensation factor depending on a particular food item is read from EEPROM 55 and stored in the RAM memory of microcomputer 30 as variable LcComp in block 205. The SetPnt temperature is stored as A/D bits and not in degrees. A particular predetermined temperature set point "SetPnt" is read from non-volatile memory in block 210. SetPnt represents a base temperature which is desired for a particular product to be cooked. Thus, a sandwich at room temperature would presumably have a lower predetermined SetPnt temperature while a frozen pizza would have a higher SetPnt value.

In block 215, the value LcLim is calculate by the formula:

$$LcLim = SetPnt - 116$$

If LcLim is less than 0 (block 220), then LcLim is set to 0 (block 225). Otherwise, if LcLim is greater than 0, then LcLim is calculated in block 230 as:

$$LcLim = 1.7608(SetPnt) - 202.26$$

Next, a temperature error value TempErr is calculate in block 235 by the formula:

$$TempErr = AirTemp - LcLim$$

where AirTemp is the current actual air temperature is the oven cavity as detected by air temperature probe 15. Temperature from air probe 15 is read in and filtered through conditioning circuit 83 and into A/D channel of microcomputer 30. Additionally, block 230 determines whether an error exists in air temperature probe 15. TempErr is an error value representing the difference between the current actual air temperature and the desired air temperature for the current base temperature SetPnt.

Using a lookup table stored in non-volatile memory, a value LcTable is selected in block 240 from the previously read load compensation factor LcComp. The following table shows the entry for valid values of LcComp:

| LcComp | LcTable Entry |
|--------|---------------|
| 0 | 0.000 |
| 1 | 0.102 |
| 2 | 0.200 |
| 3 | 0.298 |
| 4 | 0.400 |
| 5 | 0.502 |
| 6 | 0.600 |
| 7 | 0.702 |
| 8 | 0.800 |
| 9 | 0.902 |
| 10 | 1.000 |

Note that these table entries step from 0 to 100% in steps of approximately 10%.

In block 242, a variable N1 is set by the formula:

$$N1 = (LcTable)(TempErr)$$

If N1 is less than 63 (block 244) then N1 is set to 63 in block 246. This is necessary to establish the maximum amount of load compensation that can occur. Note that the constant 63 could be another number but is preferably set to this value. Referring now to FIG. 2b, if TempErr is less than 0 (block 248), then LcReset is set to 200 (block 250). Otherwise, LcReset is calculated by the following formula in block 252:

$$LcReset = 200 - 2(N1)$$

Timer interrupts occur 2,000 times a second and are described in FIG. 5. Referring briefly to FIG. 5, block 501 indicates the beginning of the timer interrupt handler subroutine. In block 503, the timer data register is reset. In block 505, load compensation 0.1 second clock is updated. In block 507, the 0.1 second clock is updated. In block 509, the 1 second clock is updated. And in block 511, the subroutine interrupt instruction is returned.

FIG. 2b shows that in block 254, LcSec is set to 10. In block 255, LcCount is set to equal LcReset.

In block 260 of FIG. 2b, the clock LcCount is decremented. In block 265, if LcCount is equal to 0, then the clock LcSec is decremented in block 270. Otherwise, LcCount is again decremented in block 260. If clock LcSec is equal to 0 (block 275), then QClock is decremented in block 280. Otherwise, the process returns to block 235 and again goes through the above described steps.

If QClock equals 0 in block 285, then quartz lamps 10 are turned off in block 290. Otherwise, the process again returns to block 235.

From the above we see that the counter LcReset determines the length of a compensated second.

To summarize, the clocks involved in load compensation are:

LcCount: is initialized to LcReset. LcCount is decremented at each timer interrupt, and times are approximately 0.1 seconds. Actual time is 0.1 "compensated" second.

LcSec: is initialized to 10. LcSec is decremented (in UpdQClock routine) each time LcCount reaches 0, and its time approximately equals 1 second. Actual time is 1 "compensated" second.

QClock: is initialized to the total seconds in a predetermined and programmed interval (brown, cook or finish). QClock is decremented (in UpdQClock routine), each time LcSec equals 0. Its actual time is the total "compensated" interval time.

While the present invention has been disclosed with respect to a preferred embodiment and modifications thereto, further modifications will be apparent to those of ordinary skill in the art within the scope of the claims that follow. For example, although the formulas used to determine load compensation are linear as a function of air temperature and the SetPnt, this is not mandatory. A polynomial or logarithmic function would provide a better approximation to the effects of cooking time and temperature, but would complicate the process.

The compensation time could be made a function of the actual base temperature as well as the base SetPnt and other factors, including the air temperature as described above. The compensation could be designed to extend the quartz lamp on-time as well as the above described decrease in quartz on-time. Additionally, the quartz on-time compensation could be designed to work in conjunction with total cooking time compensation rather than on an interval basis.

The load compensation factor need not be the same for all intervals, and more intervals than three could be added. Greater details on operation of the steps in the above implementation are described in great detail in the source code attached at Apendix A. These details shown in this Appendix are primarily concerned with underflow, overflow, fractional representations of binary numbers and handling of signs of binary numbers. Refer specifically to the routines "READPROD, AIRSTAT and UPDQCLOCK in this Appendix. All these techniques are obvious and well known to one skilled in the art and may include other techniques known to those skilled in the art. Consequently, it is not intended that the invention be limited by the disclosure, but instead that its scope be determined entirely by reference to the claims which follows.

We claim:

1. An oven for cooking food having a cavity and a base comprising:
    first and second heating means for heating food located in the oven, the first heating means having a thermal intensity greater than the second heating means, and the first heating means capable of being activated for a predetermined time;
    first temperature sensing means for sensing the temperature of the oven and located relative to the cavity of the oven; and
    automatic controller means, operatively connected to said first and second heating means and coupled to and responsive to the first temperature sensing means, for selectively controlling the first heating means to alter the predetermined time.

2. The oven of claim 1 wherein the first temperature sensing means senses the temperature of the cavity.

3. The oven of claim 1 wherein the second heating means is located relative to the base.

4. The oven of claim 1 wherein the first heating means is located relative to the cavity.

5. The oven of claim 1 wherein the first heating means comprises a radiant heating element.

6. The oven of claim 1 wherein the food is cooked during at least three cooking intervals.

7. The oven of claim 6 wherein the first heating means may be selectively switched from either a first or a second state during each of the cooking intervals.

8. The oven of claim 1 wherein the automatic controller reduces the predetermined time.

9. The oven of claim 1 wherein the automatic controller is also responsive to a predetermined temperature.

10. The oven of claim 1 wherein the automatic controller is also responsive to a predetermined compensation value.

11. The oven of claim 1 wherein the automatic controller reduces the predetermined time.

12. The oven of claim 1 wherein the automatic controller is also responsive to a predetermined temperature.

13. The oven of claim 1 wherein the automatic controller is also responsive to a predetermined compensation value.

14. A method for controlling a first means for heating food comprising the steps of:
   setting a first clock to a first predetermined clock value corresponding to a time for which the first means is switched to a first state;
   reading a compensation factor from a memory;
   continuously calculating a temperature error;
   calculating a compensated clock value dependent upon at least the compensation factor and the temperature error and setting a second clock to the compensated clock value;
   continuously decrementing the second clock;
   decrementing the first clock when the second clock falls below a second predetermined clock value; and
   switching the first means to a second state when the first clock falls below a third predetermined clock value.

15. The method of claim 14 wherein the read compensation factor is selected from a compensation table.

16. The method of claim 14 further comprising the steps of setting a third clock to a fourth predetermined clock value;
   continuously decrementing the third clock; and
   decrementing the second clock when the third clock falls below a fifth predetermined clock value.

17. The method of claim 14 wherein the oven comprises at least the first and a second means for heating food, the first means having a thermal intensity greater than the second means.

18. The method of claim 14 wherein the temperature error is based upon at least a current temperature and a predetermined temperature value.

19. A method for cooking food in a an oven comprising a cavity, a base, and first and second heating means for heating food in the oven, the method of cooking comprising the steps of:
   activating the first heating means for a predetermined time;
   sensing the temperature of the oven; and,
   selectively controlling the first heating means to alter the predetermined time in response to the first temperature sensing means.

20. The method of claim 19 wherein the food is cooked during at least three cooking intervals.

21. The method of claim 20 wherein the first heating means may be selectively switched between either a first or a second state during each of the cooking intervals.

22. The method of claim 19 wherein the selectively controlling step reduces the predetermined time.

23. The method of claim 19 wherein the selectively controlling step is also in response to a predetermined temperature.

24. The method of claim 19 wherein the selectively controlling step is also in response to a predetermined compensation value.

25. The method of claim 19 wherein the first heating means has a thermal intensity greater than the second heating means.

26. A control system for a food oven having a cavity, a base, and first and second heating means for heating food located in the oven, the first heating means having a thermal intensity greater than the second heating means, comprising:
   means for activating the first heating means for a predetermined time;
   first temperature sensing means for sensing the temperature of the oven, the temperature sensing means being located relative to the cavity of the oven; and
   automatic controller means, operatively connected to said first and second heating means and coupled to and responsive to the first temperature sensing means, for selectively controlling the first heating means to alter the predetermined time.

27. The control system of claim 26 wherein the first temperature sensing means senses the temperature of the cavity.

* * * * *